United States Patent [19]

Gomes et al.

[11] Patent Number: 4,497,040

[45] Date of Patent: Jan. 29, 1985

[54] METHOD AND APPARATUS FOR CUSTOMIZING A MULTI-STATION DOCUMENT-INSERTER

[75] Inventors: John M. Gomes, Bridgeport; Peter N. Piotroski, New Canaan, both of Conn.

[73] Assignee: Pitney Bowes Inc., Stamford, Conn.

[21] Appl. No.: 394,385

[22] Filed: Jul. 1, 1982

[51] Int. Cl.[3] .................. G06F 9/22

[52] U.S. Cl. .................. 364/900

[58] Field of Search .................. 364/200 MS, 900 MS, 364/200, 900, 478; 209/564

[56] References Cited

U.S. PATENT DOCUMENTS

| | | | |
|---|---|---|---|
| 3,391,272 | 7/1968 | Drew | 209/564 |
| 3,559,188 | 1/1971 | Proctor | 364/200 |
| 4,051,459 | 9/1977 | Storanko et al. | 364/900 |
| 4,358,016 | 11/1982 | Richardson et al. | 209/564 |
| 4,381,552 | 4/1983 | Nocilini et al. | 364/900 |

*Primary Examiner*—Harvey E. Springborn

*Attorney, Agent, or Firm*—Michael J. DeSha; William D. Soltow, Jr.; Albert W. Scribner

[57] ABSTRACT

A method and associated apparatus are used for customizing a multi-section document inserter which uses a standard program which defines all the executable routines for the document inserter. The method comprises the steps of providing user inputs as to the desired configuration and operation of the multi-station document inserter, translating the user inputs into a specific data table for use with the standard program in the multi-station document inserter, and incorporating the specific data table into the multi-station document inserter for selecting the executable routines of the standard program to be used in order to provide a multi-station inserter which is customized to accomplished particular user requirements.

10 Claims, 1 Drawing Figure

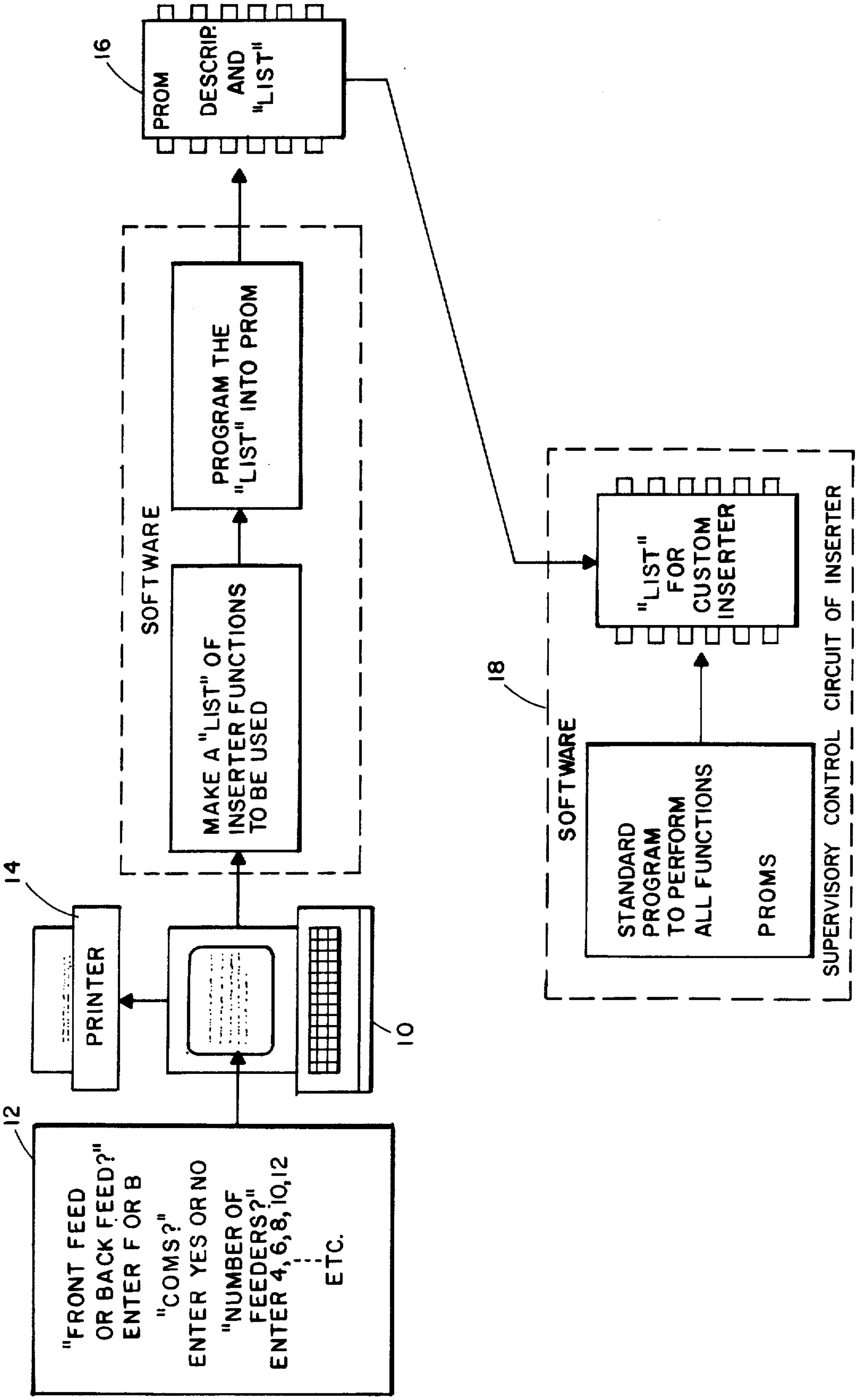
12
"FRONT FEED OR BACK FEED?" ENTER F OR B
"COMS?" ENTER YES OR NO
"NUMBER OF FEEDERS?" ENTER 4, 6, 8, 10, 12
ETC.
10
14
PRINTER
SOFTWARE
MAKE A "LIST" OF INSERTER FUNCTIONS TO BE USED
PROGRAM THE "LIST" INTO PROM
16
PROM
DESCRIP. AND "LIST"
18
SOFTWARE
STANDARD PROGRAM TO PERFORM ALL FUNCTIONS
PROMS
"LIST" FOR CUSTOM INSERTER
SUPERVISORY CONTROL CIRCUIT OF INSERTER

METHOD AND APPARATUS FOR CUSTOMIZING A MULTI-STATION DOCUMENT-INSERTER

MICROFICHE APPENDIX

The supervisory program for the multi-station document inserter and program for the configuration PROM written in PASCAL are set forth in the accompanying Microfiche Appendix with 4 microfiche having a total of 229 frames.

BACKGROUND OF THE INVENTION

The present invention relates to document inserters, and more particularly to multi-station document inserters.

Known multi-station document inserters have generally employed discrete elements requiring redesign and reconfiguration of the feeder stations, components and associated wiring for each specific customer application.

BRIEF SUMMARY OF THE INVENTION

It is an object of the present invention to provide a "standard" multi-station document inserter which may be readily configured to a particular customer application.

It is a further object of the present invention to provide customization of a multi-station document inserter to a particular customer application without the need to rewire and redesign the inserter.

It is a further object of the present invention to provide a multi-station document inserter having a standard program which does not require reprogramming for each particular customer application.

It is a further object of the present invention to provide a customized multi-station document inserter with a permanent record defining its configuration.

It is a still further object of the present invention to provide a method and apparatus for readily changing the configuration and operation of a multi-station document inserter by a simple substitution in the field.

Briefly, in accordance with the present invention, a method and associated apparatus is provided for customizing a multi-station document inserter including a standard program which defines all the executable routines for the document inserter, comprising the steps of providing user inputs as to the desired configuration and operation of the multi-station document inserter, translating the user inputs into a specific data table for use with the standard program in the multi-station document inserter, and incorporating the specific data table into the multi-station document inserter for selecting the executable routines of the standard program to be used to provide a multi-station document inserter which is customized to accomplish particular user requirements.

Other objects, aspects and advantages of the present invention will be apparent from the detailed description considered in conjunction with the preferred embodiment of the invention illustrated in the drawings, as follows:

BRIEF DESCRIPTION OF THE DRAWINGS

The FIGURE is a block diagram illustrating the method and associated apparatus for customizing a multi-station document inserter.

DETAILED DESCRIPTION

Referring to the FIGURE, the method and associated apparatus for generating a customized program for the configuration PROM of a multi-station document inserter is illustrated. The multi-station document inserter is of the type disclosed in copending patent application Ser. No. 394,388, filed July 1, 1982, in the names of Peter N. Piotroski and John M. Gomes, entitled, UNIVERSAL MULTI-STATION DOCUMENT INSERTER, the disclosure of which is incorporated herein by reference.

The document inserter includes a plurality of serially arranged modules including an envelope feeder station or module and a varying number of document feeder stations or modules in accordance with the customer requirements, and a burster-folder station or module. A computer generated forms feeder feeds continuous form control documents having coded marks thereon to the burster-folder for separating and folding. The coded marks on the control documents are sensed by a control scanner. Thereafter, the serially arranged feeder stations sequentially feed the necessary documents onto the transport deck at each station as the control document arrives at the respective station to form a precisely collated stack of documents which is transported to an envelope feeder. Preferably, the transport deck includes a ramp feed so that the control document always remains on the top of the stack of advancing documents. Such a transport deck is used in the INSERTAMAX III Mail Inserter available from Pitney Bowes, Inc. of Stamford, Conn. However, it should be understood that the transport deck may be of other types, such as that used in the INSERTAMAX II Mail Inserter available from Pitney Bowes Inc., of Stamford, Conn. or the transport deck disclosed in U.S. Pat. No. 3,934,867, issued on Jan. 7, 1976, to Frank A. Oeschger, Jr. and assigned to Pitney Bowes Inc.

The collated stack of documents is inserted in an envelope at the envelope station. The necessary postage is provided and the envelope is sealed by a postage meter, such as Pitney Bowes, Inc. Model 4255 Postage Meter. As desired, the completed envelopes may then be transported to a single or multi-level stacker. Details regarding the components of the feeder modules including the arrangement of the clutches, brakes, motors, and encoder therein may be obtained from U.S. Pat. No. 3,935,429, issued on Jan. 27, 1976, to George N. Braneky, et al., entitled, PROCESS AND APPARATUS FOR CONTROLLING DOCUMENT FEEDING MACHINES FROM INDICIA CONTAINED ON A DOCUMENT FED THEREFROM and assigned to Pitney Bowes, Inc. of Stamford, Conn.

The feeder stations are arranged in parallel between a signal bus and a power bus so that each of the feeder stations has a unique address code in the signal bus. Further, the feeder station most remote from the evelope feeder station, which is normally but not necessarily a burster/folder, includes a control scanner interface circuit. Advantageously, by any scanning multi-document feeder may be used in the position to feed a control document.

Further, a supervisory control circuit is electrically coupled to the signal bus and to a transport interface circuit. A power supply is coupled to the power bus, the supervisory control circuit and to the transport interface circuit. The feeder interface circuits and scanner interface circuits in the feeder modules are arranged in parallel between the signal bus and the power bus. Also coupled to the signal bus and power bus is an accessory interface circuit. In response to signals from the supervisory control circuit, the accessory interface circuit provides output signals to various accessories such as postage meters, and the multi-level power stackers. Coupled to the supervisory control circuit is the central control display.

The supervisor control circuit or central microprocessor includes a signal board computer, such as National BLC 20-4 available from National Semiconductor Corporation, or other similar signal board computer available from Intel Corporation, and an auxiliary memory board such as National BLC 104 available from National Semiconductor Corporation, or other similar auxiliary memory board. The signal board microcomputer and auxiliary board include plug-in sockets for receiving PROMS. Suitable PROMS are type 2716, available from National Semiconductor Corporation.

A supervisory program capable of running all the devices of the inserter and all defined control functions is stored in the plug-in PROMS. An additional PROM, a configuration PROM, includes a data table which specifies a particular inserter configuration and the functions to be performed for that configuration by the executable routines in the supervisory program.

An apparatus 10 for blowing PROMS, such as an Intel MDS system available from Intel Corporation, Santa Clara, Calif., is activated by a operator to generate a configuration PROM having the desired inserter configuration. A source program is generated for use in the Intel MDS system for configuring the PROM. Advantageously, a high level language may be used for the program such as PASCAL as illustrated in the Microfiche Appendix.

Information is programmed into the PROM by the Intel MDS system in object code in accordance with the source program. This information is obtained from customer responses to listings of instructions 12 as to the desired inserter configuration and operation. Table I at the end of the specification illustrates a format for the control document feeder (one such format is used per inserter); Table II at the end of the specification illustrates a format for the EOC (End of Collation) options (one such format is used for each scanning feeder); Table III at the end of the specification illustrates a format for the document feeders (one such format is used for each feeder, excluding the control document feeder); and Table IV at the end of the specification illustrates a format for the envelope feeder (one such format is used per inserter).

Advantageously, the apparatus 10 is electrically coupled to a printer 14 to provide a hard copy of the data table or object code blown into the configured PROM 16 in accordance with customer responses to the formats in Tables I-IV. The output listing for the configuration PROM is set forth in Table V. This listing may also be readily stored on a floppy disk, as desired. The apparatus 10 displays the instructions to be used on its associated CRT screen and blows or programs the "list" into an erasable PROM memory chip 16. A particularly PROM identification code and/or inserter description is also blown into the PROM 16. The configuration PROM 16 is then plugged into the supervisory control circuit of the multi-station document inserter of the type described in the aforementioned copending patent application.

As described above the configuration PROM 16 provides a "list" or data table in object code for customizing the inserter 18 by instructing a standard program which is resident in the supervisory control circuit of the inserter 18 and includes executable routines for performing all defined inserter functions, which specific executable routines are to be utilized for this specific inserter.

As described in more detail in the aforementioned copending patent application, the standard program is capable of operating a document inserter to perform all defined functions in accordance with any one of a variety of customer requirements (maximum inserter configuration). The customer can select any subset of this maximum configuration in accordance with the responses to the formats in Tables I-IV. However, functions undefined in the standard program are not implemented.

An example of the printout for the PROM listing is provided in Table V. The hard copy printout includes a PROM identification code for the configuration PROM 16 as well as the configuration listing thereof providing a permanent record thereof. Further, the use of PASCAL language facilitates the storage of the PROM listing on a floppy disk. Advantageously, such a hard copy allows prompt duplication of an identical configuration PROM and provides control information as to the specific data table originally blown into a PROM. Further, by using a configuration PROM the configuration of an inserter may be changed or upgraded in the field by a service technician by simply removing the old configuration PROM and substituting a new configuration PROM with a different data table.

It should be understood by those skilled in the art that various modifications may be made in the present invention without departing from the spirit and scope thereof as described in the specification and defined in the appended claims.

TABLE I

| APPLICATION #394385 | |
|---|---|
| Delay Time (Ø-99): | ____ |
| Cycle Stop ON Time (Ø-99): | ____ |
| Cycle Stop OFF Time (Ø-99): | ____ |
| How many Feeders (exclude Control Doc. Feeder) (1-11): | ____ |
| Uses Multiple Stackers (Y/N): | ____ |
| CONTROL DOCUMENT FEEDER | |
| Start feed time (Ø-99): | ____ |
| Sense ON time (Ø-99): | ____ |
| Sense OFF time (Ø-99): | ____ |
| Pieces to feed or overcount (Ø-99): | ____ |
| Error Responses | |
| Uses double error (Y/N), action: | ____ |
| Uses fail-to-feed error (Y/N), action: | ____ |
| Uses late-feed error (Y/N), action: | ____ |
| Scanner Information | |
| Area 1 Zones (1-6 or Ø if not used): | ____ |
| Area 2 Zones (1-6 or Ø if not used): | ____ |
| Lines per inch (6 or 8): | ____ |
| Document with valid scan data: | ____ |
| # Scanner channels (1-6): | ____ |
| Enter benchmark channel (1- ): | ____ |
| Area 1 Delay: | ____ |
| Area 1 Safety MAP (Y/N), (X-Y) (X=1-6, Y=Ø-5): | ____ |

TABLE II

| APPLICATION #394385 | |
|---|---|
| EOC Options | |
| Uses EOC (Y/N): | ____ |
| Dash Code or mark/hole: | ____ |
| Enter EOC Code (X-Y) (X = 1-6, Y = Ø-5): | ____ |
| Uses match code (Y/N) (X-Y): | ____ |
| Uses Feeder 1 Select MAP (Y/N) (X-Y): | ____ |
| Uses Feeder 2 Select MAP (Y/N) (X-Y): | ____ |
| Uses Feeder 3 Select MAP (Y/N) (X-Y): | ____ |
| Uses Feeder 4 Select MAP (Y/N) (X-Y): | ____ |
| Uses Feeder 5 Select MAP (Y/N) (X-Y): | ____ |
| Uses Feeder 6 Select MAP (Y/N) (X-Y): | ____ |
| Uses Feeder 7 Select MAP (Y/N) (X-Y): | ____ |
| Uses Feeder 8 Select MAP (Y/N) (X-Y): | ____ |
| Uses Feeder 9 Select MAP (Y/N) (X-Y): | ____ |
| Uses Feeder 10 Select MAP (Y/N) (X-Y): | ____ |
| Uses Feeder 11 Select MAP (Y/N) (X-Y): | ____ |
| Uses Meter Select MAP (Y/N) (X-Y): | ____ |
| Uses Seal Select MAP (Y/N) (X-Y): | ____ |
| Uses Mark Select MAP (Y/N) (X-Y): | ____ |
| Uses Deflect Select MAP (Y/N) (X-Y): | ____ |
| Uses Stacker 1 Select MAP (Y/N) (X-Y): | ____ |
| Uses Stacker 2 Select MAP (Y/N) (X-Y): | ____ |
| Uses Stacker 3 Select MAP (Y/N) (X-Y): | ____ |
| Uses Stacker 4 Select MAP (Y/N) (X-Y): | ____ |
| Uses Stacker 5 Select MAP (Y/N) (X-Y): | ____ |
| Uses Stacker 6 Select MAP (Y/N) (X-Y): | ____ |
| Uses Stacker 7 Select MAP (Y/N) (X-Y): | ____ |
| Uses Count Feature (Y/N) (Feeder #) (X-Y): | ____ |

TABLE III

| APPLICATION #394385 | |
|---|---|
| Feeder # | |
| Standard or scanning feeder: | ____ |
| On or Selectable: | ____ |
| Start feed time (Ø-99): | ____ |
| Enclosure sense ON time (Ø-99): | ____ |
| Enclosure sense OFF time (Ø-99): | ____ |
| If Multi-Document Feeder | |
| Enter enclosures to be fed or overcount (Ø-99): | ____ |
| Uses match option (Y/N): | ____ |
| Allowed mismatch count: | ____ |
| Uses postage break (Y/N): | ____ |
| - Lower postage break: | ____ |
| - Upper postage break: | ____ |
| Enter feed stop method: | ____ |
| Error Responses | |
| Uses double error (Y/N), action: | ____ |
| Uses fail-to-feed error (Y/N), action: | ____ |
| Uses late-feed error (Y/N), action: | ____ |
| Action to take for count error: | ____ |
| Action to take for match error: | ____ |
| Action to take for < postage break: | ____ |
| Action to take for >postage break: | ____ |
| Enter Area 1 Zones (1-6 or Ø if not used): | ____ |
| Enter Area 2 Zones (1-6 or Ø if not used): | ____ |
| Lines per inch (6 or 8): | ____ |
| Document with valid scan data: | ____ |
| # Scanner channels (1-6): | ____ |
| Enter benchmark channel (1-_): | ____ |
| Area 1 Delay: | ____ |
| Area 1 Safety MAP (Y/N), (X-Y): | ____ |
| Uses EOC (Y/N): | ____ |

TABLE III-continued

| APPLICATION #394385 | |
|---|---|
| Dash or Mark/Hole: | ____ |
| Enter EOC Code (X-Y): | ____ |

TABLE IV

| APPLICATION #394385 | |
|---|---|
| Envelope Feeder | |
| Start feed time (Ø-99): | ____ |
| Enclosure sense ON time (Ø-99): | ____ |
| Enclosure sense OFF time (Ø-99): | ____ |
| Jam sense ON time (Ø-99): | ____ |
| Jam sense OFF time (Ø-99): | ____ |

TABLE V

PITNEY BOWES COMPUTER OUTPUT MAILER CONFIGURATION PROM LISTING

```
PROM NAME IS F1 PATENT VØØ
DELAY TIME = 8
CYCLE STOP ON TIME = 33
CYCLE STOP OFF TIME = 34
CONTROL DOCUMENT FEEDER STATUS
FEED TIME = 58
ENCLOSURE ON SENSE TIME = Ø
ENCLOSURE OFF SENSE TIME = 1
INITIAL OPERATOR COUNT = 5
ERROR RESPONSES
ACTIONS TO TAKE FOR DOUBLE
NOT USED
AREA 1 ZONE COUNT = 6
AREA 2 ZONE COUNT = Ø
LINE SPACING VALUES
CONFIGURATION 1 - 544
CONFIGURATION 2 - NOT USED
CONFIGURATION 3 - NOT USED
CONFIGURATION 4 - NOT USED
DOCUMENTS CONTAINING VALID SCAN DATA -
CHECK ALL PIECES
SCANNER USES 1 CHANNELS
AREA 1 DELAY = 544
END OF COLLATION CODE INFORMATION
END OF COLLATION CODE IN AREA 1
END OF COLLATION CODE IS DASH CODE
END OF COLLATION MAP
              1
             ----
            5\ -
            4\ -
            3\ -
            2\ -
            1\ -
AREA 1      Ø\ -
BENCHMARK BIT IS 1
MATCH FEATURE NOT USED
FEED SELECT 1
              1
             ----
            5\ -
            4\ -
            3\ -
            2\ -
            1\ -
AREA 1      Ø\ -
FEED SELECT 2
              1
             ----
            5\ -
            4\ -
            3\ -
            2\ -
            1\ -
AREA 1      Ø\ -
```

TABLE V-continued

| PITNEY BOWES COMPUTER OUTPUT MAILER CONFIGURATION PROM LISTING |
|---|
| FEEDER STATUS |
| STATION # 1 |
| STANDARD FEEDER |
| FEED TIME = 58 |
| ENCLOSURE ON SENSE TIME = 22 |
| ENCLOSURE OFF SENSE TIME = 37 |
| STATION # 2 |
| STANDARD FEEDER |
| FEED TIME = 54 |
| ENCLOSURE ON SENSE TIME = 22 |
| ENCLOSURE OFF SENSE TIME = 44 |
| STATION # 3 |
| STANDARD FEEDER |
| FEED TIME = 58 |
| ENCLOSURE ON SENSE TIME = 22 |
| ENCLOSURE OFF SENSE TIME = 44 |
| STATION # 4 |
| SCANNING FEEDER |
| FEED TIME = 8Ø |
| ENCLOSURE ON SENSE TIME = Ø |
| ENCLOSURE OFF SENSE TIME = 1 |
| INITIAL OPERATOR COUNT = 1 |
| MATCH INFORMATION |
| NOT USED |
| POSTAGE BREAK USED = FALSE |
| FEED STOP METHOD IS OPERATOR SET COUNT |
| ERROR RESPONSES |
| ACTIONS TO TAKE FOR DOUBLE |
| HALT MACHINE |
| ACTIONS TO TAKE FOR FEED FAIL |
| NOT USED |
| ACTIONS TO TAKE FOR FEED LATE |
| NOT USED |
| AREA 1 ZONE COUNT = Ø |
| AREA 2 ZONE COUNT = Ø |
| LINE SPACING VALUES |
| CONFIGURATION 1 - NOT USED |
| CONFIGURATION 2 - NOT USED |
| CONFIGURATION 3 - NOT USED |
| CONFIGURATION 4 - NOT USED |
| DOCUMENTS CONTAINING VALID SCAN DATA - NOT USED |
| SCANNER USES 1 CHANNELS |
| END OF COLLATION CODE INFORMATION |
| NOT USED |
| BENCHMARK BIT IS 1 |
| STATION # 5 |
| STANDARD FEEDER |
| FEED TIME = 58 |
| ENCLOSURE ON SENSE TIME = 22 |
| ENCLOSURE OFF SENSE TIME = 44 |
| ENVELOPE FEEDER STATUS |
| START FEED TIME = 78 |
| ENCLOSURE ON SENSE TIME = 8Ø |
| ENCLOSURE OFF SENSE TIME = 55 |
| JAM ON SENSE TIME = 84 |
| JAM OFF SENSE TIME = 92 |

What is claimed is:

1. A method for customizing a multi-station document inserter having stations adapted for use in a plurality of selectable configurations and which includes a standard program having executable routines operable for causing performance of all of a plurality of inserter functions, comprising the steps of:
   - obtaining user inputs relating to a particular desired configuration and operation of the selected stations multi-station document inserter;
   - translating the user inputs into a specific data table for use with the standard program in the multi-station document inserter; and
   - incorporating the specific data table into the multi-station document inserter for selecting those particular executable routines of the standard program to be used to provide a multi-station document inserter which is customized to accomplish particular user requirements.

2. The method recited in claim 1, wherein the step of incorporating the specific data table includes:
   - blowing the specific data table into a PROM which is thereupon incorporated into the inserter.

3. The method recited in claim 2, wherein the steps of obtaining user input includes providing formats for customer responses regarding the inserter configuration and operation.

4. The method recited in claim 2, further comprising the step of:
   - providing a hard copy of a program listing of said specific data table as blown into the PROM.

5. The method recited in claim 2 further comprising the step of:
   - blowing a PROM identification code into the PROM.

6. The method recited in claim 1, including the steps of:
   - exchanging the data table in the document inserter with another data table having other data in the data table in response to changes in the configuration and desired operation of the multi-station document inserter.

7. A method for customizing a multi-station document inserter which may be configured in any of a plurality of different configurations, comprising the steps of:
   - providing a standard program having a plurality of executable routines for controlling all of a plurality of defined functions of the multi-station document inserter;
   - selecting one of the plurality of inserter configurations and those predetermined defined functions to be utilized by the multi-station document inserter;
   - blowing a data table representing the inserter configuration and desired defined functions to be used therewith into a PROM along with an indentification code therefor; and
   - inserting the blown PROM into the multi-station document inserter to cause the standard program to operate the multi-station document inserter in accordance with the particular selected configuration and the defined functions specified in the data table.

8. Apparatus for customizing a multi-station document inserter which includes storage means for storing a standard program having executable routines for performing all of a plurality of defined inserter functions, comprising:
   - format means for providing user inputs as to a desired configuration and operation of the multi-station document inserter;
   - PROM means;
   - means for translating the user inputs into a specific data table in the PROM means for use with the standard program stored in the storage means of the multi-station document inserter; and
   - means interconnecting said PROM means with the storage means wherein the executable routines of the standard program to be used to provide a multi-station document inserter which is customized to accomplish particular uses requirements.

9. The apparatus recited in claim 8, including:
   - means for providing a hard copy of the customer responses and an identification code for said PROM means into which the specific data table is blown.

10. The apparatus recited in claim 8, wherein:
   - said translating means includes means for blowing an identification code into said PROM means.

* * * * *